US008832707B2

(12) United States Patent
Henderson et al.

(10) Patent No.: US 8,832,707 B2
(45) Date of Patent: Sep. 9, 2014

(54) TUNABLE ERROR RESILIENCE COMPUTING

(75) Inventors: Daniel J. Henderson, Georgetown, TX (US); Prabhakar N. Kudva, New York, NY (US); Naresh Nayar, Rochester, MN (US); Pia Naoko Sanda, Slingerlands, NY (US); David William Siegel, Austin, TX (US); James Van Oosten, Rochester, MN (US); James Xenidis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 12/642,908

(22) Filed: Dec. 21, 2009

(65) Prior Publication Data

US 2011/0154351 A1 Jun. 23, 2011

(51) Int. Cl.
*G06F 9/46* (2006.01)
*G06F 15/173* (2006.01)
*G06F 9/50* (2006.01)

(52) U.S. Cl.
CPC ................................... *G06F 9/5027* (2013.01)
USPC ........... 718/104; 718/100; 718/101; 718/102; 718/103; 718/105; 709/223; 709/224; 709/226

(58) Field of Classification Search
USPC ........... 718/100, 102, 104; 709/223, 224, 226
See application file for complete search history.

(56) References Cited

U.S. PATENT DOCUMENTS

| | | | |
|---|---|---|---|
| 7,107,285 B2 | 9/2006 | von Kaenel et al. | |
| 8,037,475 B1 * | 10/2011 | Jackson | 718/104 |
| 2004/0205206 A1 * | 10/2004 | Naik et al. | 709/230 |
| 2005/0071450 A1 * | 3/2005 | Allen et al. | 709/223 |
| 2005/0165925 A1 * | 7/2005 | Dan et al. | 709/224 |
| 2006/0288251 A1 * | 12/2006 | Jackson | 714/19 |
| 2007/0083588 A1 * | 4/2007 | Keller et al. | 709/202 |
| 2008/0034093 A1 * | 2/2008 | Sutou | 709/226 |
| 2008/0059214 A1 * | 3/2008 | Vinberg et al. | 705/1 |
| 2008/0120619 A1 * | 5/2008 | Podila | 718/102 |
| 2008/0148015 A1 | 6/2008 | Takamoto et al. | |
| 2008/0209033 A1 * | 8/2008 | Ginter et al. | 709/224 |
| 2008/0240150 A1 * | 10/2008 | Dias et al. | 370/465 |
| 2008/0320482 A1 * | 12/2008 | Dawson et al. | 718/104 |
| 2009/0043888 A1 * | 2/2009 | Jackson | 709/225 |
| 2009/0113434 A1 * | 4/2009 | Podila | 718/102 |
| 2009/0119673 A1 * | 5/2009 | Bubba | 718/104 |
| 2009/0313623 A1 * | 12/2009 | Coskun et al. | 718/100 |
| 2010/0153960 A1 * | 6/2010 | Youn et al. | 718/104 |

OTHER PUBLICATIONS

Rosenblum, "Impact of Virtualization on Computer Architecture and Operating Systems", ACM, ASPLOS'06, Oct. 2006, San Jose CA, pp. 1.
Hankins et al., "Multiple Instruction Stream Processor", Proceedings of the 33rd International Symposium on Computer Architecture (ISCA'06), 2006, IEEE, pp. 1-12.
Wang et al., "Sequencer Virtualization", ACM 2007, ICS'07, Jun. 2007, Seattle, WA, pp. 148-157.
Briquet et al., "Reproducible Testing of Distributed Software with Middleware Virtualization and Simulation", ACM 2008, PADTAD'08, Jul. 2008, Seattle WA, pp. 1-11.
Kalla et al., "IBM Power5 Chip: A Dual-Core Multithreaded Processor", IEEE Micro, vol. 24, No. 2, Mar.-Apr. 2004, USA, pp. 40-47.

* cited by examiner

*Primary Examiner* — Charles Swift
(74) *Attorney, Agent, or Firm* — Yee & Associates, P.C.

(57) ABSTRACT

An attribute of a descriptor associated with a task informs a runtime environment of which instructions a processor is to run to schedule a plurality if resources for completion of the task in accordance with a level of quality of service in a service level agreement.

15 Claims, 6 Drawing Sheets

FIG. 7 {
710
700 read the descriptor associated with this task
if a descriptor attribute indicates a redundant dispatch is required, then
    get a thread for the redundant work
    dispatch the work item on the redundant thread
        on the redundant thread
            complete the work item
            return the result
    complete the work item on the main thread
    wait for the results from the redundant thread
    compare the two results
    if the results are the same
        destroy redundant thread or return it to its pool
        return the result to the caller   // success
    else   // handle miscompare
        destroy redundant thread or return it to its pool
        return an error or throw an exception   // failure
        (this path could be enhanced by adding retries if indicated by the SLA)
else   // no redundant dispatch
    perform the work item on the main thread
    return the result 810
800

(on host node)
read the descriptor associated with this task
if a descriptor attribute indicates a redundant dispatch and reliable transport is required, then
    get a thread for the redundant work
    for each input parameter of the work item
        call a checksum function for the input parameter
        add the resulting checksum to a list
    dispatch the work item and checksum list on the redundant thread
        on the redundant thread
            send the work item and checksum list in a request to remote device A
            wait for the response from device A
            return the response
    send the work item and checksum list in a request to remote device B on the main thread
    wait for the response from device B
    wait for the response from the redundant thread
    if both responses indicate success, then
        if both responses have the same checksum list, then
            select one of the responses (either is valid)
            for each return value in the response
                call a checksum function for the return value
                add the checksum to a list
                    if the calculated checksum list is the same as the response checksum list, then
            return the result to the caller.   // success
        else // handle miscompare

FROM FIG. 8A

```
            return an error or throw an exception // failure
        else // response checksum list don't agree
            return an error or throw an exception // failure
    if one of the responses indicates success
        select the successful response
            for each return value in the response
                call a checksum function for the return value
                add the checksum to a list
            if the calculated checksum list is the same as the response checksum list, then
                return the result to the caller.    // success
            else // handle miscompare
                return an error or throw an exception // failure
        else // response checksum list don't agree
            return an error or throw an exception // failure
    if one of the responses indicates success
        select the successful response
            for each return value in the response
                call a checksum function for the return value
                add the checksum to a list
            if the calculated checksum list is the same as the response checksum list, then
                return the result to the caller.    // success
            else // handle miscompare
                return an error or throw an exception // failure
    else // both responses were not successful
        return an error or throw an exception // failure
else // no redundant dispatch
    send the work item in a request to remote device
    wait for the response from the device
    if the response indicates success
        return the result
    else
        return an error or throw an exception
(on remote device)
    receive request from host
    if request includes checksums, then
        for each input parameter in the request work item
            call a checksum function for the value
            add the checksum to a list
        compare the calculated checksums with the checksums that were sent in the request
        if the checksums are the same
            complete the work item in the request
            for each return value
                call a checksum function for the value
                add the checksum to a list
            create a response with return values, checksums, and success indicator
            send the response to the host
        else
            create a response with a failure indicator
            send response to the host
    else // no checksums
        complete the work item in the request
        create a response with return values and success indicator
        send response to the host
```

TUNABLE ERROR RESILIENCE COMPUTING

BACKGROUND

1. Field

The disclosure relates generally to scheduling resources by a runtime environment, and more particularly to informing the runtime environment, by an attribute of a descriptor, of which instructions to run to schedule a plurality of resources for completion of a task in accordance with a level of quality of service in a service level agreement.

2. Description of the Related Art

Customers may contract with one or more providers for computer services. In other cases, customers may also have in-house computers which they may manage based on quality of service needs. The computer services entail data processing by multiple machines over one or more networks. Indeed, the multiple machines may involve tens of thousands of processors performing calculations for thousands of customers, each customer having a plurality of accounts, and each account having one or more applications necessary to perform various data processing requirements. In addition to multiple applications within each account, there can be multiple users within an account. In many cases, each account has different resiliency concerns depending on the application and the user.

Resiliency concerns differ for a number of reasons. First, some errors have extreme consequences while other errors have no real consequence. An example of an extreme consequence may be an error in a flight control system. An example of a data error without a significant consequence may be an error in copying a video file.

Whether catastrophic or inconsequential, data processing errors must be managed appropriately. Data processing errors occur at runtime. Runtime refers to the time one or more programs are run on one or more resources. Management of data processing errors accepts the fact that integrated circuits occasionally fail or produce incorrect data at runtime. Failures and incorrect data can be controlled and corrected to the degree computing resources are committed to such control by a runtime environment. The cost of committing computing resources to control of errors increases along with the increasing complexity of ever smaller integrated circuit design, and the increasing complexity of systems connecting vast numbers of machines and applications in virtual or cloud computing environments. Soft errors, due to transient particles and hard errors, or due to equipment failure, result in incorrect running, data integrity problems, and machine stops. While a particular piece of hardware can be designed to stringent specifications, the resiliency of that particular piece of hardware is affected by other devices that may be attached to it directly or through a network by a runtime environment. The attached devices may have been built to vastly different resiliency standards. Moreover, data flows between hardware through input/output adapters can also result in errors.

Perhaps the most common method for avoiding the hard errors resulting from equipment failure, and for detecting soft errors due to transient particles, involves running two or more copies of an application either on the same hardware or on different hardware. The results of the computation of the two copies are compared frequently. When the results of the computation of the two copies do not match, an error is detected. Resiliency can be increased further by adding additional redundancy. On the one hand, redundancy enables detection and correction of errors. On the other hand, redundancy involves additional cost in resources, performance, and power consumption. For example, when an application is run twice, memory and processing resource demands increase. The increase in memory and processing resource demands translates into higher costs due to power consumption and the time an account is billed for using resources.

Accordingly, there is a need for a method and apparatus, which takes into account one or more of the issues discussed above as well as other possible issues.

SUMMARY

In an embodiment, a computer-implemented method comprises scheduling a plurality of resources in a runtime environment in accordance with a particular level of quality of service by configuring, by one or more processors of a computer, the runtime environment to include a plurality of components, each component containing a plurality of instructions; reading, by the processor, an attribute of a descriptor associated with a task in a service level agreement; responsive to reading the attribute, selecting, by the processor, a particular component of the plurality of components; and responsive to selecting the particular component, running, by the processor, the particular component to schedule the plurality of resources in order to complete the task in accordance with the particular level of quality of service in the service level agreement.

In an embodiment, an apparatus comprises a service provider computing system, a client computing system, a middleware connecting the service provider computing system and the client computing system, a runtime environment for the service provider computing system and the client computing system. The runtime environment includes a plurality of resources. A descriptor is associated with a task in a service level agreement. Responsive to a request from the client computing system to run the task in the service provider computing system, one or more processors in the runtime environment, read an attribute of the descriptor, and responsive to reading the attribute, select a particular component of the plurality of components to schedule the plurality of resources in order to complete the task in accordance with a particular level of quality of service in the service level agreement.

In an embodiment, a computer program product comprises a computer readable storage medium and a plurality of instructions stored in the computer readable storage medium. The plurality of instructions are configured to perform actions, by a processor of a computer, comprising: configuring the runtime environment to include a plurality of components, each component containing a plurality of instructions, and reading an attribute of a descriptor associated with a task in a service level agreement. Responsive to reading the attribute, selecting a particular component of the plurality of components, responsive to selecting the particular component, running the particular component to schedule the plurality of resources in order to complete the task in accordance with the particular level of quality of service in the service level agreement, and responsive to the plurality of instructions, invoking a plurality of patterns from a pattern library, wherein each of the plurality of patterns is a set of instructions to augment the runtime environment in order to meet the level of quality of service of the service level agreement indicated by the attribute of the descriptor. Responsive to the plurality of instructions, scheduling a resiliency operation on only a critical code segment of the task.

BRIEF DESCRIPTION OF THE SEVERAL VIEWS OF THE DRAWINGS

FIG. 7 is a pseudo-code for a redundant computation operation in accordance with the illustrative embodiments; and FIGS. 8A and 8B are a pseudo-code for a redundant dispatch and reliable transport operation in accordance with the illustrative embodiments.

DETAILED DESCRIPTION

Figure 1:
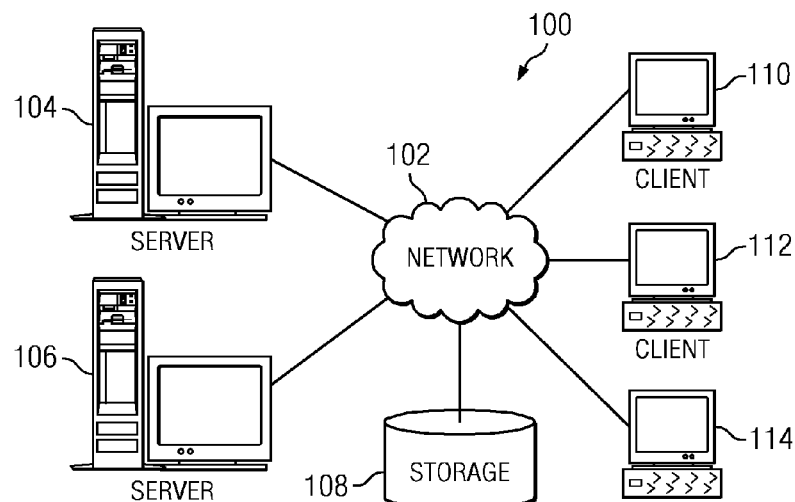
FIG. 1 is a pictorial representation of a network of data processing systems in which illustrative embodiments may be implemented.

As will be appreciated by one skilled in the art, the tunable error resilience system may be embodied as a system, method or computer program product. Accordingly, the tunable error resilience system may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the tunable error resilience system may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for running by or in connection with the instruction running system, apparatus, or device. The computer-usable medium may include a propagated data signal with the computer-usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the tunable error resilience system may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The tunable error resilience system is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to perform a series of operational steps on the computer or other programmable apparatus to produce a computer implemented process such that the instructions which run on the computer or other programmable apparatus provide processes for implementing the functions/acts specified in the flowchart and/or block diagram block or blocks.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium providing communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In one embodiment, service level agreement program 310 (see FIG. 3) may be implemented on server 104, server 106, client 110, client 112, or client 114.

Program code located in network data processing system 100 may be stored on a computer recordable storage medium and downloaded to a data processing system or other device. For example, program code may be stored on a computer recordable storage medium on server 104 and downloaded to client 110 over network 102 to be run on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a plurality of different types of networks, such as for example, an intranet, a local area network (LAN), or a wide area network (WAN). FIG. 1 is intended as an example, and not as an architectural limitation, for the different illustrative embodiments. Persons skilled in the art are aware that a network data processing system, such as network data processing system 100, may include multiple interconnected networks including storage networks and server networks.

Figure 2:
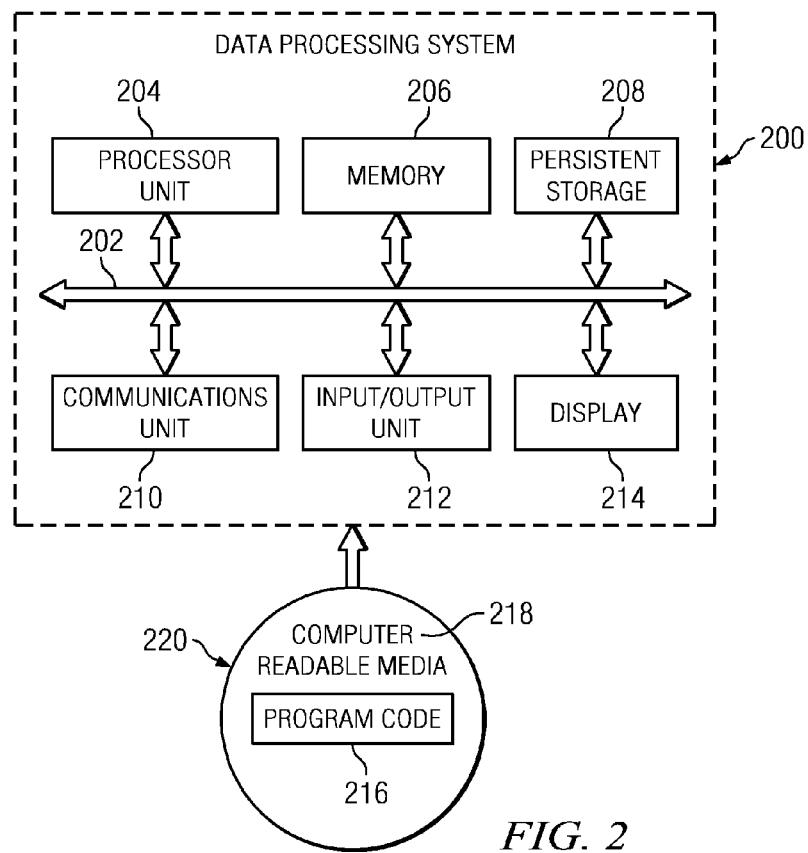
FIG. 2 is a block diagram of a data processing system in which illustrative embodiments may be implemented.

Turning now to FIG. 2, a diagram of a data processing system is depicted in accordance with an illustrative embodiment. The data processing system is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media providing persistent storage 208 may be removable. For example, a removable hard drive may be persistent storage 208.

Communications unit 210, in these examples, provides for communication with other data processing systems or devices. In these examples, communications unit 210 is a network interface card. Communications unit 210 may provide communications through either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220. In one example, computer readable media 218 may be a computer readable storage media or a computer readable signal media. Computer readable storage media may include, for example, an optical or magnetic disc that is inserted or placed into a drive or other device that is part of persistent storage 208 for transfer onto a storage device, such as a hard drive, that is part of persistent storage 208. Computer readable storage media also may take the form of a persistent storage, such as a hard drive, a thumb drive, or a flash memory that is connected to data processing system 200. In some instances, computer readable storage media may not be removable from data processing system 200.

Alternatively, program code 220 may be transferred to data processing system 200 using computer readable signal media. Computer readable signal media may be, for example, a propagated data signal containing program code 216. For example, computer readable signal media may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 216 may be downloaded over a network to persistent storage 208 from another device or data processing system through a computer readable signal media for running within data processing system 200. For instance, program code stored in a computer readable storage media in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices to transmit and receive data, such as a modem or a network adapter. Further, a memory may be, for example, memory 206 or a cache such as found in an interface and memory controller hub that may be present in communications fabric 202.

Figure 3:
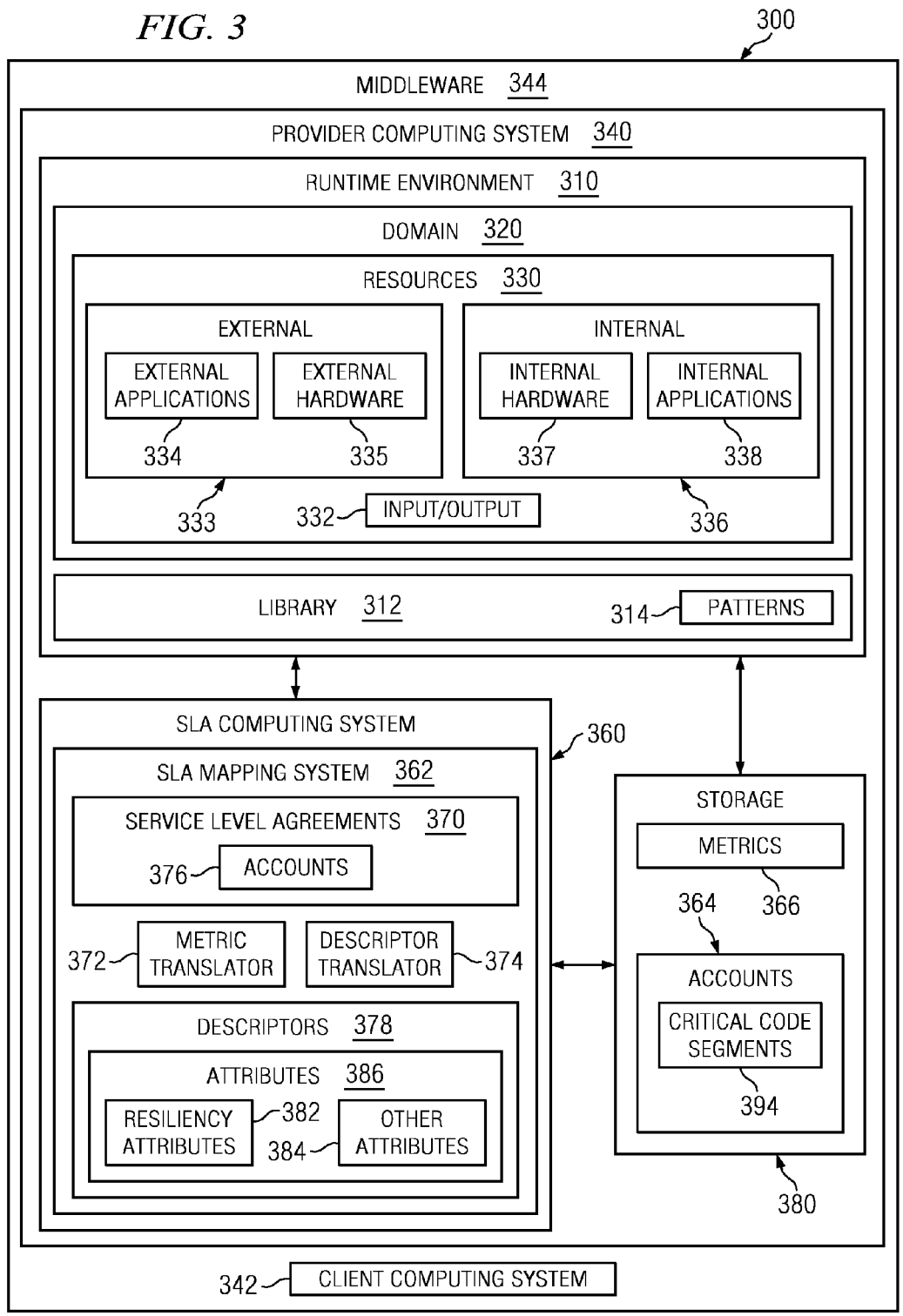
FIG. 3 is a block diagram of a tunable error resilience system in which illustrative embodiments may be implemented.

FIG. 3 is a block diagram of a tunable error resilience system 300 in which an attribute of a descriptor associated with a task informs a runtime environment 310 of which instructions the runtime environment 310 is to run to schedule a plurality of resources 330 for completion of the task in accordance with a level of quality of service. Tunable error resilience computing system 300 comprises provider computing system 340 connected to client computing system 342 by middleware 344. Client computing system 342 makes requests for services to provider computing system 340. The services requested are contracted for in service level agreements controlled by service level agreement computing system 360. As used herein, "middleware" means computer software that connects software components or applications.

Provider computing system 340 has a plurality of domains 320, each domain having a plurality of resources 330. Client computing system 342 may make a request for a service in accordance with a service level agreement. When client computing system 342 makes a request for a service, runtime environment 310 controls scheduling of resources 330 in provider computing system 340 in accordance with the service level agreement. As used herein, "runtime environment" shall mean a configuration of hardware and software required to schedule a plurality of tasks for a plurality of applications on a plurality of resources. The configuration of hardware and software may include, without limitation, one or more of the following: a plurality of CPUs, a plurality of operating systems, a plurality of engines, a plurality of firmware, a plurality of drivers, a plurality of kernels, a plurality of hypervisors, a plurality of real time operating systems, a plurality of software and a plurality of privileged software. As used herein, "task" means (1) a computational unit to be scheduled by a runtime environment where the computational unit cannot be broken down into a smaller unit, and (2) a computational unit that can be executed immediately, at a later time, or that may be scheduled to run in a batch. Therefore, a task may range in size from a single line of code to a complete application.

The service level agreement may be a service level agreement in service level agreements 370 of service level agreement computing system 360. Furthermore, the request for a service may be for an account in accounts 376 in service level agreements 370. Each account in accounts 376 corresponds to a domain such as domain 320 in provider computing system 340. As used herein, the term "domain" means a descriptive boundary within a computer system described by specific users, groups of users, or by applications. Within domain 320, a plurality of resources, such as resources 330, are assigned.

Resources 330 may comprise input/output resources 332, internal resources 336, and external resources 333. Internal resources 336 further comprise internal hardware 337 and internal applications 338. External resources 333 may comprise external hardware 335 and external applications 334.

Library 312 may be connected to runtime environment 310. Library 312 contains patterns 314. Patterns 314 may be patterns for resiliency operations. As used herein, resiliency operations may include, without limitation, dual thread redundancy operations, redundancy checks, checksums, cyclic redundancy checks, parity checks, replication checks, partial replication checks, and residue checks. Resiliency patterns 314 may include other or additional patterns as needed for a required resiliency operation. As used herein, "resiliency operation" means any operation that checks data for correctness or verifies that the data is correct based on a result of the operation. As used herein, a "checksum" means the sum of a group of data associated with the group and used for checking purposes. As used herein, "cyclic redundancy check" means a redundancy check in which the check key is generated by a cyclic algorithm, and also a system of error checking performed at both the sending and receiving station after a block character has been accumulated. As used herein, the term "parity" means a data transmission attribute used to ensure error-free transmission. As used herein, "partial replication" means to copy a specified portion of data. As used herein, "replication" means to copy all of a portion of data. As used herein, a "residue check" means a validation check in which an operand is divided by a number n to generate a remainder that is then used for checking.

Service level agreement computing system 360 may automate management of service level agreements, accounts within the service level agreements, and descriptors associated with tasks to be performed in accordance with a quality of service level in the service level agreements. Service level agreement computing system 360 may comprise service level agreement mapping system 362, service level agreements 370, descriptors 378, metric translator program 372, and descriptor translator program 374. Descriptors 378 may be for tasks performed on resources 330. Descriptors 378 may have attributes 386 so that each descriptor may have one or more attributes. Attributes 386 may be resiliency attributes 382 or other attributes 384. Each resiliency attribute such as a resiliency attribute from resiliency attributes 382 is associated with a task and the attribute informs the runtime environment of which of the plurality of components of the runtime environment to run to schedule a plurality of resources in order to complete the task in accordance with a particular level of quality of service. Components of runtime environment 310 are configured to schedule resiliency operations in accordance a resiliency attribute.

As used herein, "service level agreement" means a contract between a system solution provider and a customer that formally defines both of the services to be provided for one or more accounts, and the quality of service to be provided for each of the accounts.

Storage 380 may be connected to service level computing system 360 and comprises metrics file 366 and accounts file 364. Accounts file 364 may include critical code segments 394. As used herein, "critical code segment" means a one or more lines of specifically identified lines of code that must be run correctly in order for a certain level of quality of service to be achieved.

Figure 4:
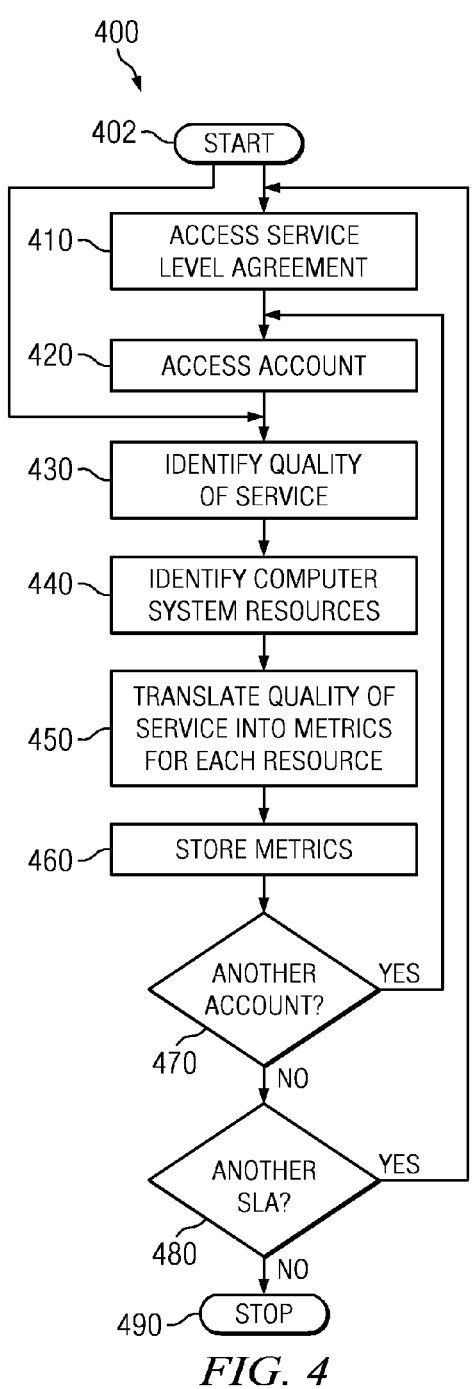
FIG. 4 is a flowchart of a metric translation process in accordance with the illustrative embodiments.

FIG. 4 is a flowchart of the metric translation process. Metric translation process may be metric translator 372 (see FIG. 3). Referring to FIG. 4, metric translation program 400 starts (step 402) and accesses a service level agreement (step 410), such as a service level agreement from service level agreements 370, and accesses an account such as account of the service level agreement from accounts 376 (step 420). Metric translation program 400 identifies a quality of service level for a service level agreement by accessing a service level agreement such as a service level agreement from service level agreements 370 (step 430). Metric translation program 400 identifies the computer system resources, such as resources 330, that will be performing one or more tasks detailed in the service level agreement (step 440). Metric translation program 400 translates a quality of service level, such a quality of service level specified in a service level agreement from service level agreements 370, into a plurality of metrics for resources 330 within service level agreement computing system 360 (step 450), and stores each of the plurality of metrics in a metric file, such a metrics file 366 (step 460). If there is another account (step 470), metric translation program 400 goes to step 420, and if not, determines if there is another service level agreement (step 480). If there is another service level agreement, metric translation program 400 goes to step 410, and if not, stops (step 490).

Figure 5:
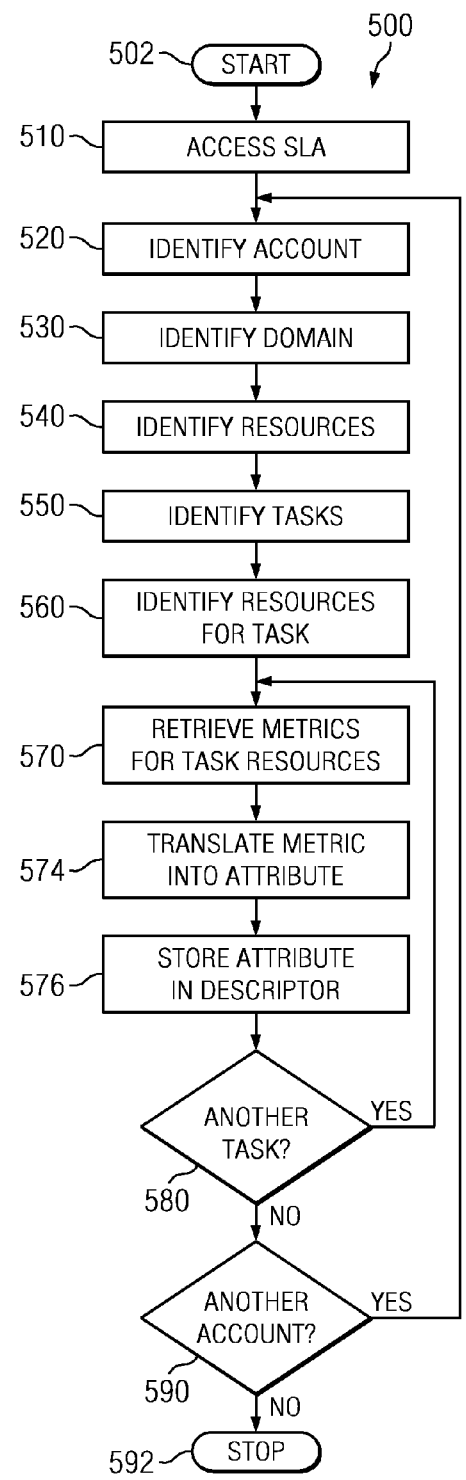
FIG. 5 is as flowchart of a descriptor translation process in accordance with the illustrative embodiments.

FIG. 5 is as flowchart of the descriptor translation process. Descriptor translation process may be descriptor translator 374 of FIG. 3. Referring to FIG. 5, descriptor translation process 500 begins (step 502) and accesses a service level agreement, such as a service level agreement in service level agreements 370 (step 510), identifies an account from accounts 376 (step 520), identifies a domain for the account, such as domain 320 (step 530), and identifies the resources within the domain, such as resources 330 (step 540). Descriptor translation program 500 identifies the tasks to be performed in accordance with the service level agreement (550). As used herein, the term "task" means a single unit of work represented by computer code that can range from a single line of code to one or more entire applications, and thus includes, without limitation, code segments, functions, routines, sub-routines, and combinations of the foregoing. Descriptor translation program 500 identifies resources for the task such as resources within resources 330 (step 560), and retrieves the metric or metrics for the resources with which the task will be performed from a file such as metric file 366 (step 570). Descriptor translation program 500 translates the metric or metrics into an attribute (step 574) and stores the attribute in a descriptor such as a descriptor in descriptors 378 (step 574). If there is another task (step 580), descriptor translation program goes to step 570, and if not, a determination is made whether there is another account (step 590). If so, descriptor translation program goes to step 520, and if not stops (step 592). In an embodiment, an attribute is determined for a task and stored in a descriptor associated with the task so that the runtime environment, having been configured to read the descriptor when a request for the task is made to a provider computing system, may upon reading the attribute in the descriptor, schedule resources to perform the task in accordance with the quality of service level specified in the service level agreement for the account. The descriptors allow granularity in the level of resiliency provided by task as will be further shown below.

In an embodiment, the descriptor for a task may be associated with the task in a variety of ways. First, in a coarse grained method, a single descriptor may be associated with all related tasks within a domain. Second, in a more granular method than the first method, the descriptor may be defined in a metadata associated with the application requesting that the task be run by the provider computing system. Third, in a fine grained method, the descriptor may be embedded in the application program directly or with code annotations so that whenever the application requests to be run on the provider computing system, the runtime environment would read the attribute in the descriptor and schedule the task on resources according to the permanently attached descriptor. The descriptor may also be generated by a compiler.

Figure 6:
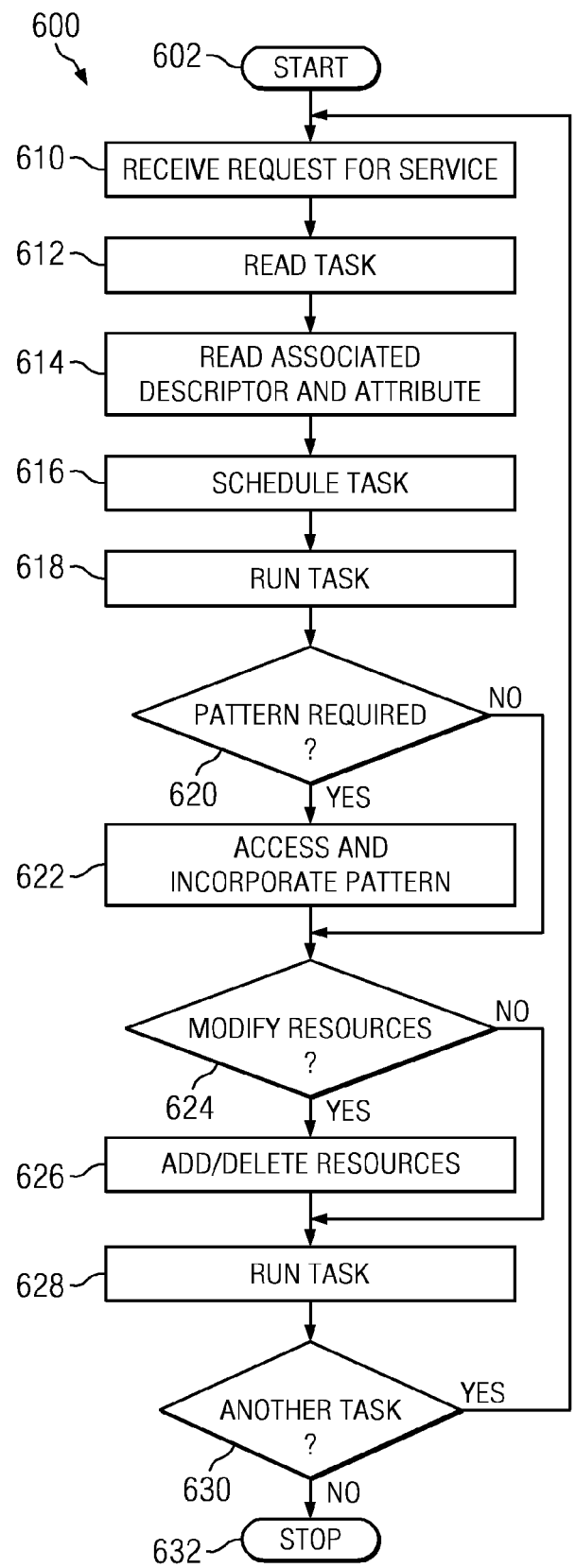
FIG. 6 is a flowchart of a tunable error resilience process in accordance with the illustrative embodiments.

FIG. 6 is a flowchart of the runtime process 600. Runtime process 600 begins (step 602) and receives a request for a service (step 610). A task is read (step 612) and the associated descriptor and the attribute in the descriptor is read (step 614). Tasks are scheduled by the runtime environment in accordance with the attribute (step 616). Scheduling the tasks in step 616 includes selecting a particular component of a plurality of components in the runtime environment, wherein each component includes a plurality of instructions.

The task is run (step 618). A determination is made if the task requires a pattern for a resiliency operation (step 620). If a pattern for a resiliency operation is required, the pattern is accessed and incorporated into the runtime environment for the scheduled task (step 622). Next, a determination is made as to whether resources are to be modified (step 624). If resources are to be modified, resources are added or deleted (step 626). If at step 620 a pattern was not required, then runtime process goes to step 624. If resources are not to be modified, runtime process runs the task (step 628). A determination is made whether another task is to be run (step 630). If another task is to be run, runtime process 600 goes to step 610. If another runtime process is not to be run, runtime process stops (632).

In an embodiment, the middleware may be incorporated into the runtime environment to accomplish the runtime tasks. In an embodiment, the runtime environment may be firmware loaded onto a device at Power-On, software loaded onto the device after Power-On, implemented by middleware, such as the Open Computer Language (OpenCL), or implemented by the operating system of the computer device or by the operating system of the host device.

In an embodiment, the runtime application accesses the domain and account files, maps each of the plurality of tasks to one or more domains of the computer system in accordance with a particular account, and assigns a resource type and a map to a pattern, if any, to accomplish each task in each domain in accordance with the descriptor corresponding to the task, the resource type assigned, and the mapped pattern, if any. Each task may be accomplished using the resources assigned by the runtime environment. The runtime environment schedules and coordinates the interdependent resources. The runtime environment assigns tasks to resources and manages interdependencies between the tasks. Resources that are assigned may include hardware and/or software for resiliency operations in accordance with the instructions in a pattern in the library. The runtime application runs each task in accordance with instructions selected by the attribute in the descriptor and in accordance with any patterns accessed in accordance with instructions in the runtime selected by the attribute.

In an embodiment, the descriptor associated with a task may specify that the runtime environment assign resources for the task and run the task based on the descriptor requirements using the library map. For example, if the descriptor calls for computation on parallel processors using replicated threads or duplicate resources, a first accelerator and a second accelerator may be invoked.

FIG. 7 is a pseudo-code for redundant computation. The first line of the pseudo-code 710 states "read the descriptor associated with this task." The pattern continues "if the descriptor element indicates a redundant dispatch is required, the get a thread for the redundant work . . . " and so on.

FIGS. 8A and 8B are a pseudo-code for redundant computation and reliable transport using checksum. In FIG. 8A, the checksum could be replaced by another form of checking such as cyclic redundancy checking. Each of the two pseudo-code examples could be implemented using runtime programs such as firmware, middleware, or operating system, or combinations thereof. As in FIG. 8A, the first line reads "read the descriptor associated with this task" 810.

In an embodiment, a computer-implemented method comprises scheduling a plurality of resources in a runtime environment in accordance with a particular level of quality of service by configuring, by one or more processors of a computer, the runtime environment to include a plurality of components, each component containing a plurality of instructions, reading, by the processor, an attribute of a descriptor associated with a task in a service level agreement, responsive to reading the attribute, selecting, by the processor, a particular component of the plurality of components, and responsive to selecting the particular component, running, by the processor, the particular component to schedule the plurality of resources in order to complete the task in accordance with the particular level of quality of service in the service level agreement.

In an embodiment, an apparatus comprises a service provider computing system, a client computing system, a middleware connecting the service provider computing system and the client computing system, a runtime environment for the service provider computing system and the client computing system, wherein the runtime environment includes a plurality of resources, and a descriptor associated with a task in a service level agreement. Responsive to a request from the client computing system to run the task in the service provider computing system, one or more processors in the runtime environment, read an attribute of the descriptor, and responsive to reading the attribute, select a particular component of the plurality of components to schedule the plurality of resources in order to complete the task in accordance with a particular level of quality of service in the service level agreement.

In an embodiment, a computer program product comprises a computer readable storage medium and a plurality of instructions stored in the computer readable storage medium. The plurality of instructions are configured, by a processor of a computer, to perform actions comprising: configuring, the runtime environment to include a plurality of components, each component containing a plurality of instructions; and reading an attribute of a descriptor associated with a task in a service level agreement; responsive to reading the attribute, selecting, a particular component of the plurality of components; responsive to selecting the particular component, running the particular component to schedule the plurality of resources in order to complete the task in accordance with the particular level of quality of service in the service level agreement; responsive to the plurality of instructions, invoking a plurality of patterns from a pattern library, wherein each of the plurality of patterns is a set of instructions to augment the runtime environment in order to meet the level of quality of service of the service level agreement indicated by the attribute of the descriptor; and responsive to the plurality of instructions, scheduling a resiliency operation on only a critical code segment of the task.

The flowchart and block diagrams in the figures illustrate the architecture, functionality, and operation of possible implementations of systems, methods and computer program products according to various embodiments of the tunable error resilience system. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the tunable error resilience system has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Furthermore, the invention can take the form of a computer program product accessible from a computer-usable or computer-readable medium providing program code for running by or in connection with a computer or any instruction running system. For the purposes of this description, a computer-usable or computer readable medium can be any tangible apparatus that can contain, store, communicate, propagate, or transport the program for running by or in connection with the instruction running system, apparatus, or device.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the plurality of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening non-public or public networks. Modems, cable modem and Ethernet cards are just a few of the currently available types of network adapters.

The description of the tunable error resilience system has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for scheduling a plurality of resources in a runtime environment in accordance with a particular level of quality of service, comprising:
configuring, by a processor of a computer, the runtime environment to include a plurality of components, each component containing a plurality of instructions;
identifying, by the processor, a plurality of quality of service requirements for a service level agreement;
identifying, by the processor, a plurality of resources within a computing system configured to perform the service level agreement;
translating, by the processor, each of the plurality of quality of service requirements into a plurality of metrics for each of the plurality of resources in the runtime environment;
storing, by the processor, the plurality of metrics in a metrics file in a storage device;
translating, by the processor, the plurality of metrics into one attribute;
associating a descriptor with a task in the service level agreement;
storing, by the processor, the one attribute in the descriptor, the one attribute configured to inform the processor of a particular component in the runtime environment to be selected to schedule the plurality of resources in order to complete the task in accordance with the particular level of quality of service in the service level agreement;
reading, by the processor, the one attribute that is stored in the descriptor;
responsive to reading the one attribute, selecting, by the processor, the particular component of the plurality of components; and
responsive to selecting the particular component, running, by the processor, the particular component to schedule the plurality of resources in order to complete the task in accordance with the particular level of quality of service in the service level agreement.

2. The computer-implemented method of claim 1, further comprising:
modifying the plurality of resources available to the runtime environment for running the task in response to a particular instruction of the particular component.

3. The computer implemented method of claim 1, further comprising:
invoking, by the processor, a plurality of patterns from a pattern library, wherein each of the plurality of patterns is a set of instructions to augment the runtime environment in order to meet the level of quality of service of the service level agreement indicated by the one attribute.

4. The computer-implemented method of claim 1, further comprising:
scheduling, by the processor, a resiliency operation on only a critical code segment of the task.

5. The computer implemented method of claim 1, further comprising:
embedding the descriptor in an application program that requested that the task be run.

6. A computer system for scheduling a plurality of resources in a runtime environment in accordance with a particular level of quality of service, the computer system comprising:
a processor of a computer configuring the runtime environment to include a plurality of components, each component containing a plurality of instructions;
the processor identifying a plurality of quality of service requirements for a service level agreement;
the processor identifying a plurality of resources within a computing system configured to perform the service level agreement;
the processor translating each of the plurality of quality of service requirements into a plurality of metrics for each of the plurality of resources in the runtime environment;
the processor storing the plurality of metrics in a metrics file in a storage device;
the processor translating the plurality of metrics into one attribute;
the processor associating a descriptor with a task in the service level agreement;
the processor storing the one attribute in the descriptor, the one attribute configured to inform the processor of a particular component in the runtime environment to be selected to schedule the plurality of resources in order to complete the task in accordance with the particular level of quality of service in the service level agreement;
the processor reading the one attribute that is stored in the descriptor;
responsive to reading the one attribute, the processor selecting the particular component of the plurality of components; and
responsive to selecting the particular component, the processor running the particular component to schedule the plurality of resources in order to complete the task in accordance with the particular level of quality of service in the service level agreement.

7. The computer system of claim 6, wherein the plurality of resources available to the runtime environment for running the task are modified in response to a particular instruction of the particular component.

8. The computer system of claim 6, further comprising:
the processor invoking a plurality of patterns from a pattern library, wherein each of the plurality of patterns is a set of instructions to augment the runtime environment in order to meet the level of quality of service of the service level agreement indicated by the one attribute.

9. The computer system of claim 6, further comprising:
the processor scheduling a resiliency operation on only a critical portion of the task.

10. The computer system of claim 6, wherein the descriptor is embedded in an application program that requested that the task be run.

11. A computer program product for scheduling a plurality of resources in a runtime environment in accordance with a particular level of quality of service, the computer program product comprising:
a non-transitory computer readable storage medium;
a plurality of instructions stored in the computer readable storage medium, the plurality of instructions configured, by a processor of a computer, to perform actions comprising:
configuring the runtime environment to include a plurality of components, each component containing a plurality of instructions;
identifying a plurality of quality of service requirements for a service level agreement;

identifying a plurality of resources within a computing system configured to perform the service level agreement;

translating each of the plurality of quality of service requirements into a plurality of metrics for each of the plurality of resources in the runtime environment;

storing the plurality of metrics in a metrics file in a storage device;

translating the plurality of metrics into one attribute;

associating a descriptor with a task in the service level agreement;

storing the one attribute in the descriptor, the one attribute configured to inform the processor of a particular component in the runtime environment to be selected to schedule the plurality of resources in order to complete the task in accordance with the particular level of quality of service in the service level agreement;

reading the one attribute that is stored in the descriptor;

responsive to reading the one attribute, selecting, by the processor, the particular component of the plurality of components; and responsive to selecting the particular component, running, by the processor, the particular component to schedule the plurality of resources in order to complete the task in accordance with the particular level of quality of service in the service level agreement.

12. The computer program product of claim 11, wherein the plurality of instructions further comprise:

modifying the plurality of resources available to the runtime environment for running the task in response to a particular instruction of the particular component.

13. The computer program product of claim 11, wherein the plurality of instructions further comprise:

invoking a plurality of patterns from a pattern library, wherein each of the plurality of patterns is a set of instructions to augment the runtime environment in order to meet the level of quality of service of the service level agreement indicated by the one attribute.

14. The computer program product of claim 11, wherein the plurality of instructions further comprise:

scheduling a resiliency operation on only a critical code segment of the task.

15. The computer program product of claim 11, wherein the plurality of instructions further comprise:

embedding the descriptor in an application program that requested that the task be run.

* * * * *